(12) United States Patent
Baloche Faurecia

(10) Patent No.: US 7,644,989 B2
(45) Date of Patent: Jan. 12, 2010

(54) PIVOT MECHANISM, METHOD FOR MANUFACTURING IT, AND VEHICLE SEAT INCORPORATING THE MECHANISM

(75) Inventor: François Baloche Faurecia, La Carneille (FR)

(73) Assignee: Faurecia Sièges d'Automobile, Nanterre (FR)

( * ) Notice: Subject to any disclaimer, the term of this patent is extended or adjusted under 35 U.S.C. 154(b) by 474 days.

(21) Appl. No.: 11/386,031

(22) Filed: Mar. 21, 2006

(65) Prior Publication Data

US 2006/0220430 A1 Oct. 5, 2006

(30) Foreign Application Priority Data

Apr. 1, 2005 (FR) .................... 05 03243

(51) Int. Cl.
*B60N 2/225* (2006.01)
(52) U.S. Cl. .................................... 297/362
(58) Field of Classification Search ............. 297/362, 297/367
See application file for complete search history.

(56) References Cited

U.S. PATENT DOCUMENTS

| 4,564,236 | A | | 1/1986 | Kluting et al. | |
|---|---|---|---|---|---|
| 4,715,656 | A | * | 12/1987 | Walk et al. | 297/362 |
| 5,524,970 | A | * | 6/1996 | Kienke et al. | 297/362 |
| 5,536,217 | A | * | 7/1996 | Droulon et al. | 475/177 |
| 5,573,345 | A | * | 11/1996 | Voss et al. | 403/271 |
| 5,611,599 | A | * | 3/1997 | Baloche et al. | 297/367 |
| 6,007,153 | A | * | 12/1999 | Benoit et al. | 297/378.12 |
| 6,010,191 | A | * | 1/2000 | Calinaud et al. | 297/367 |
| 6,805,650 | B2 | * | 10/2004 | Branov et al. | 475/162 |
| 6,830,298 | B2 | * | 12/2004 | Koczewski | 297/362 |
| 2002/0185903 | A1 | * | 12/2002 | Hosokawa | 297/362 |
| 2003/0080599 | A1 | * | 5/2003 | Hohn et al. | 297/362 |

FOREIGN PATENT DOCUMENTS

CN 2295389 Y 10/1998
FR 2 578 601 9/1986
JP 200521487 A 1/2005

OTHER PUBLICATIONS

French Preliminary Search Report FR 0503243; report dated Dec. 6, 2005.

* cited by examiner

*Primary Examiner*—Peter R. Brown
(74) *Attorney, Agent, or Firm*—Miller, Matthias & Hull

(57) ABSTRACT

Pivot mechanism incorporating first and second rigid plates interconnected by a hypocycloid gear train, the first plate being formed in one piece with a circular toothing belonging to the hypocycloid gear train. A seat frame is fixed to the first plate by a weld located at the position of the toothing.

17 Claims, 4 Drawing Sheets

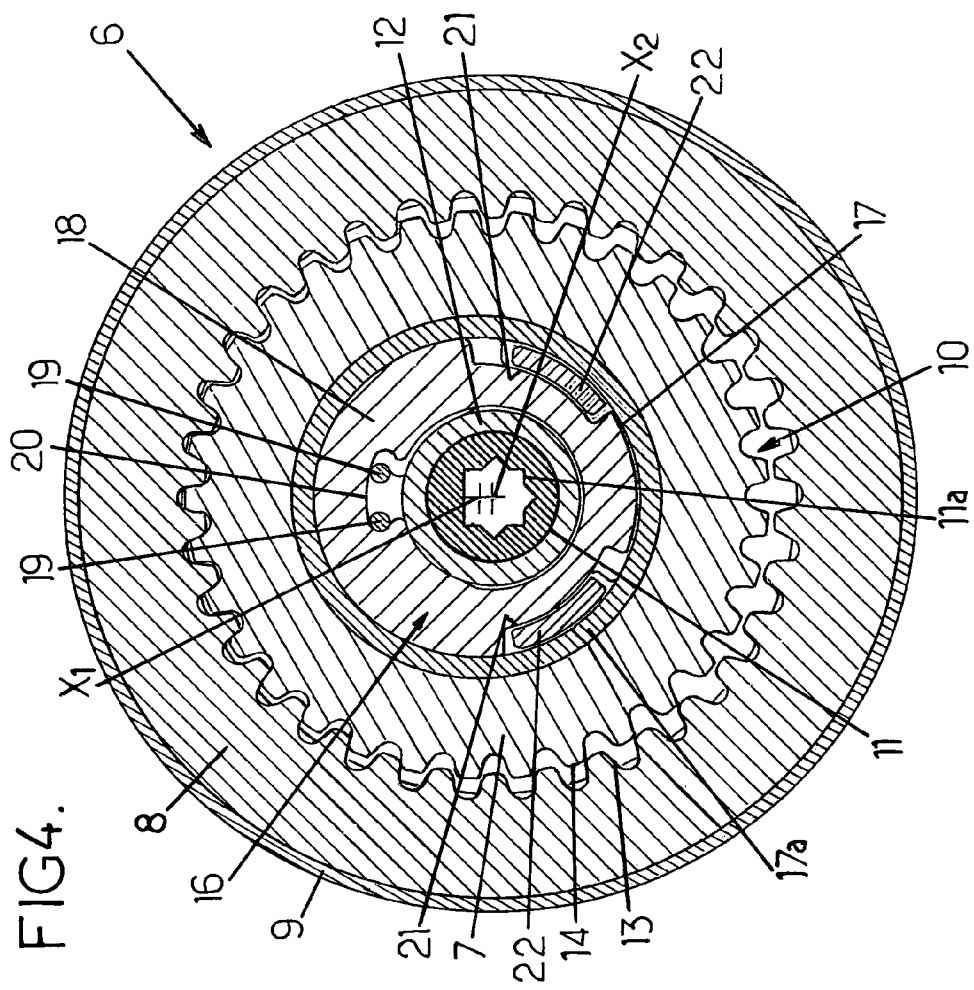
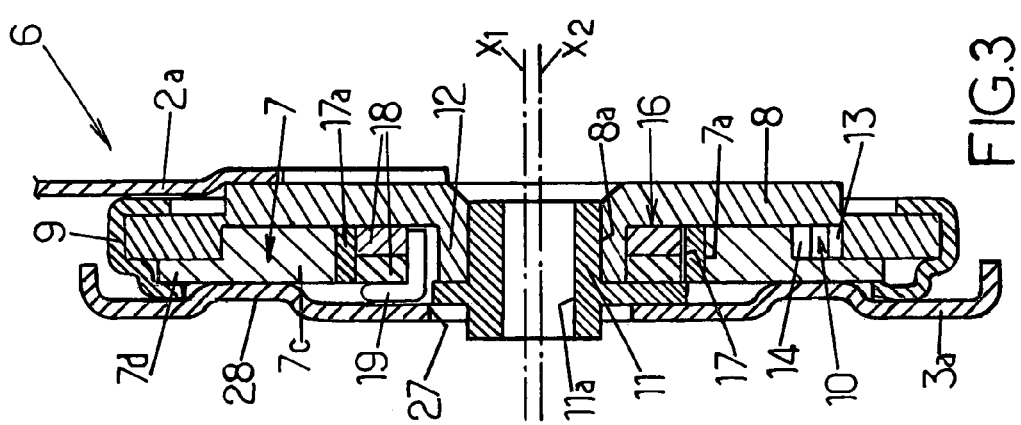

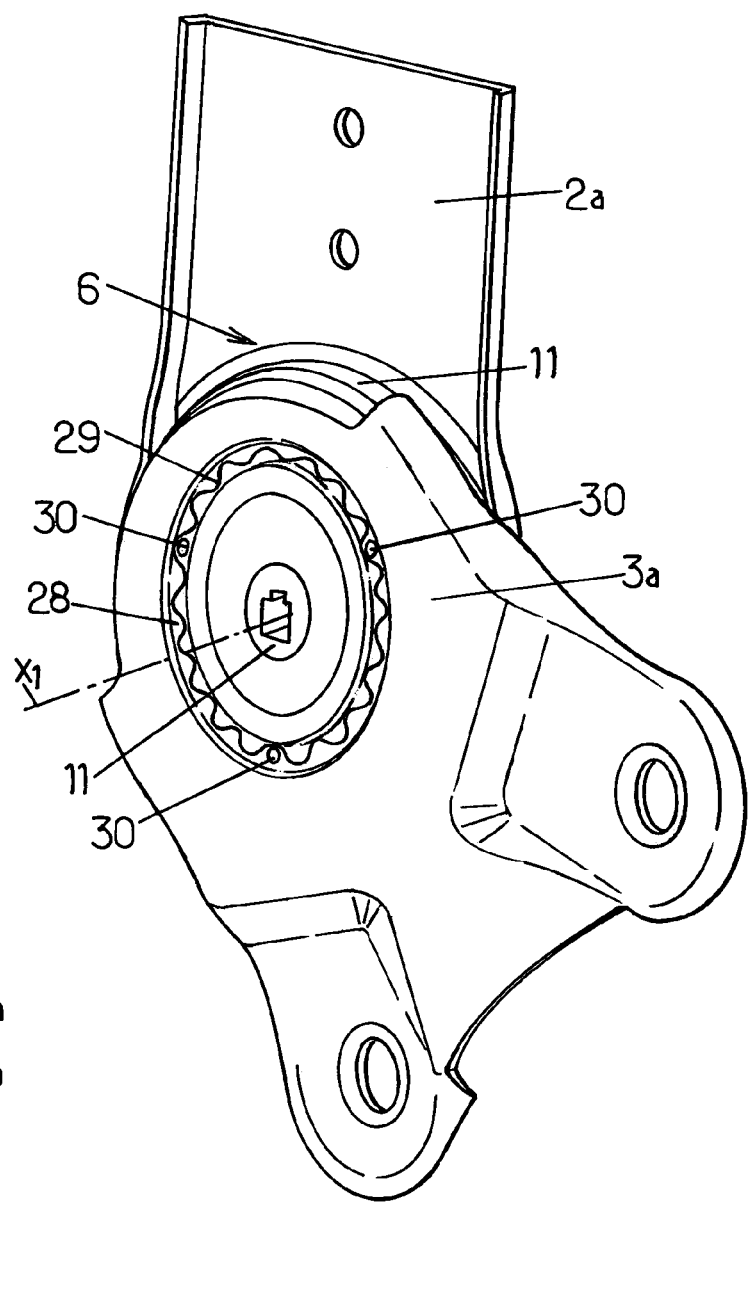
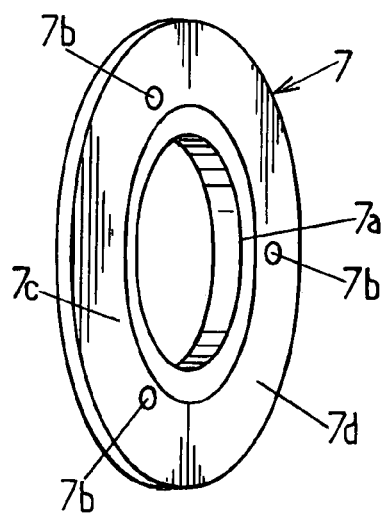

PIVOT MECHANISM, METHOD FOR MANUFACTURING IT, AND VEHICLE SEAT INCORPORATING THE MECHANISM

FIELD OF THE INVENTION

The present invention relates to pivot mechanisms for vehicle seats, methods for manufacturing them, and seats incorporating these mechanisms.

BACKGROUND OF THE INVENTION

More specifically, the invention relates to a pivot mechanism incorporating:
- first and second juxtaposed parallel rigid plates, interconnected by a hypocycloid gear train, the first plate having first and second faces, and the said first plate being formed by a single piece having an outer circular toothing belonging to the said hypocycloid gear train and positioned on the said first face,
- a first seat frame fixed to the first plate.

The document FR-A-2 578 601 describes an example of a pivot mechanism.

OBJECTS AND SUMMARY OF THE INVENTION

The object of the present invention is, in particular, to improve pivot mechanisms of this type, particularly in order to simplify and/or strengthen the fixing of the first plate to the first seat frame.

For this purpose, according to the invention, a pivot mechanism of the kind in question is characterized in that the first seat frame is welded to the second face of the first plate by at least one weld positioned in the vicinity of the first toothing (in other words in a radial position which substantially matches the radial position of the first toothing on the first face of the first plate).

Because of these arrangements, the fixing of the first seat frame to the first plate can be carried out simply, without additional parts, and this fixing can be stronger, if desired, than the screw fixing used in the aforementioned document. It should be noted, in particular, that the routing of the forces between the first toothing and the weld is direct, which contributes to this mechanical strength. Furthermore and contrary to what might have been thought initially, the weld has no unfavourable effect on the geometry or strength characteristics of the first toothing.

In some preferred embodiments of the pivot mechanism according to the invention, any one and/or other of the following arrangements can be used if required:
- the second face of the first plate is substantially flat;
- the first plate has a thick main body delimited on its radially outer side by the first toothing, and a thinner outer periphery;
- the outer periphery of the first plate is covered by a crimped sheet metal ring which also partially covers the second plate and delimits, with the said first and second plates, a closed casing containing the hypocycloid gear train, the said ring additionally extending radially inwards between the first plate and the first seat frame;
- the first back frame is a piece of sheet metal having an annular dished part projecting towards the first plate, the said annular dished part being welded to the second face of the said first plate;
- the weld has at least one annular weld line;
- the weld line is sinuous;
- the weld is formed in an area entirely covered by the first seat frame;
- the hypocycloid gear train also comprises a second circular toothing engaging with the first toothing and mechanically linked to the second plate (the second toothing can be fixed to the second plate or can belong to a satellite pinion which has a third toothing engaging with a fourth toothing fixed to the second plate), the said first and second toothings having, respectively, first and second central axes which are parallel and offset with respect to each other, the pivot mechanism also incorporating an eccentric cam rotated by an operating shaft, this operating shaft being mounted rotatably about the second axis in a bearing which is fixed to the second plate, and the said cam being mounted rotatably about the first axe in a circular housing fixed to the first plate, so that a rotation of the cam causes a relative rotation between the first and second toothings;
- a flexible annular joint is interposed between the operating shaft and the first seat frame, thus isolating the hypocycloid mechanism from the exterior (this prevents the ingress of liquid into the mechanism and/or leaks of lubricants);
- the operating shaft is fixed to an annular collar which covers an inner periphery of the first plate and which is interposed between the first seat frame and the said inner periphery (this collar facilitates the retention of the elements of the mechanism in place before the welding to the first seat frame);
- the second toothing is formed in one piece with the second plate;
- the pivot mechanism comprises indexing means to provide angular indexing between the first plate and the first seat frame.

The invention also proposes a method for manufacturing a pivot mechanism as defined above, in which method the first and second plates are assembled with the hypocycloid gear train, and the first seat frame is then welded to the first plate.

In some embodiments of this method, any one and/or other of the following arrangements can be used:
- the first seat frame is welded to the first plate by laser, through the first seat frame;
- the first plate is formed by die stamping a piece of sheet metal of constant thickness, thus forming the first toothing and compressing the part of this piece of sheet metal located radially outside the first toothing to decrease its thickness.

Finally, the invention also proposes a vehicle seat comprising a seat portion and a back, the back being mounted on the seat portion by means of at least one pivot mechanism as defined above.

BRIEF DESCRIPTION OF THE DRAWINGS

Other characteristics and advantages of the invention will be made clear by the following description of two embodiments thereof, provided by way of example and without restrictive intent, with reference to the attached drawings.

In the drawings,

FIGS. 3 and 4 are views in axial and orthoaxial section, respectively, of the pivot mechanism of FIG. 2, FIG. 5 is a perspective view of the pivot mechanism of FIG. 2, seen in a direction opposite to that of FIG. 2, FIG. 6 is a perspective view of a detail of the first plate of the pivot mechanism of FIG. 2.

MORE DETAILED DESCRIPTION

In the different figures, the same references denote identical or similar elements.

Figure 1:
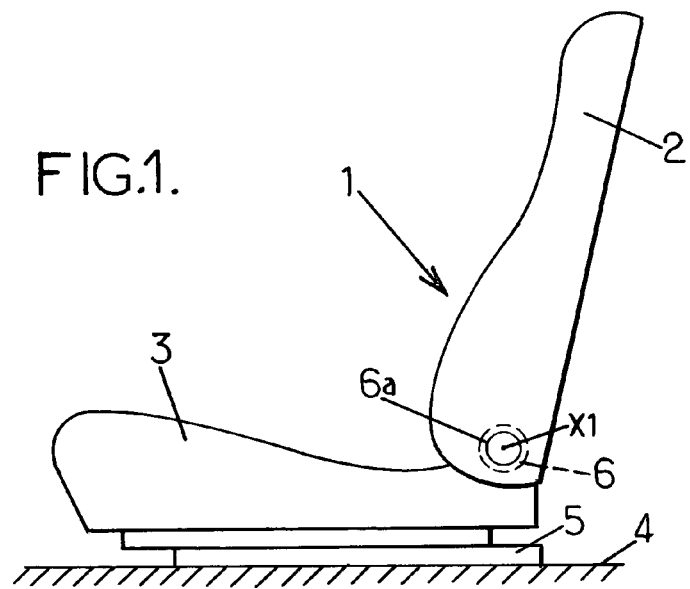
FIG. 1 is a schematic view of a vehicle seat fitted with a pivot mechanism according to the invention.

FIG. 1 shows a front seat 1 of a motor vehicle, incorporating a back 2 mounted pivotably about an axis X1 on a seat portion 3, this seat portion itself being mounted on the floor 4 of the vehicle, by means of slides 5 for example.

Figure 2:
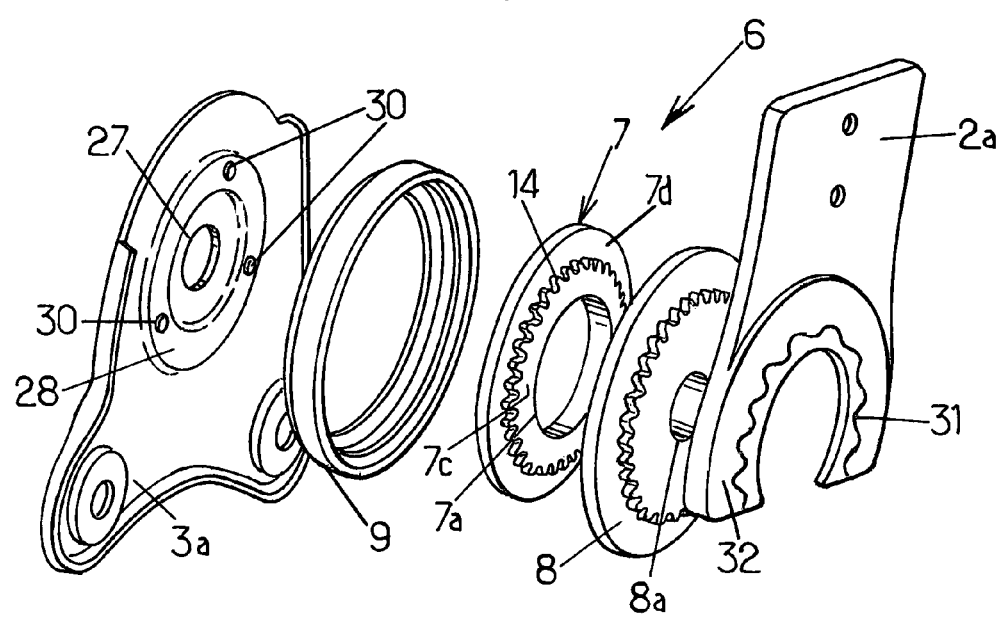
FIG. 2 is a partial exploded view of the pivot mechanism fitted to the seat of FIG. 1, in a first embodiment of the invention.

The inclination of the back 2 can thus be adjusted by means of a rotating operating knob 6a or the like, which drives a pivot mechanism 6, an embodiment of which is shown in FIGS. 2 to 4.

This pivot mechanism 6 incorporates:

a first substantially circular metal plate 7 which extends in a plane perpendicular to the axis X1 and which, in the example shown, is fixed to a first metal seat frame 3a, belonging for example to the frame of the seat portion 3, a second metal plate 8 which also has a circular shape and which extends parallel to the first plate 7, this second plate 8 being mounted rotatably about the axis X1 with a nutation movement, the said second plate 8 being fixed to a second metal seat frame 2a, belonging for example to the back frame 2, a crimped metal ring 9 which has a substantially U-shaped profile open towards the inside and which covers the periphery of the first and second plates 7 and 8 so as to form a closed casing in combination with these plates, a hypocycloid gear train 10 interposed between the first and second plates, inside the casing, and a metal operating shaft 11 parallel to the axis X1, this shaft being fixed to the operating knob 6a (for example by the fitting of a rod (not shown) fixed to the operating knob 6a into a non-circular hole 11a of the shaft 11, through central passages 7a and/or 8a formed, respectively, in the first and second plates 7 and 8), the operating shaft 11 being journalled in a bearing 12 formed by a collar of the second plate 8, projecting towards the first plate 7, the said bearing 12 being centred on the second axis X2.

The hypocycloid gear train 10 comprises, for example, a first toothing 14 centred on the axis X1, this toothing being orientated radially outwards and formed on the inner face of the first plate 7, in one piece with the latter, a second toothing 13 which is formed on the inner face of the plate 8 and which is orientated radially inwards, this first toothing being centred on a second axis X2 parallel to X1 but offset with respect to the latter, the said second toothing 13 having an inside diameter greater than the outside diameter of the first toothing 14, and an eccentric metal cam 16 extending perpendicularly to the axis X1 and driven by the shaft 11, this cam being journalled about the collar 12 in a cylindrical housing 17 fixed to the plate 8 and centred on the axis X1 (the housing 17 can be formed, for example, by a ring 17a applied to a central cut-out 8a of the second plate 8).

Thus the rotation of the shaft 11 causes a rotation of the cam 16 which itself causes a rotation of the second plate 8 with a nutation movement with respect to the first plate 7.

The cam 16 could be formed in one piece, but in the particular case considered here it consists of:

two superimposed eccentric discs 18, each of which extends perpendicularly to the axis X1, the discs being mounted with a degree of play in rotation with respect to the operating shaft 11 and around the bearing 12, each of these two discs having a radially inner cut-out 20 and two radially outer cut-outs 21, the said cut-outs being positioned in such a way as to be offset angularly from one disc to the other, and the cut-outs 21 of the two discs being penetrated by two axial fingers 22 which are fixed to the operating shaft 11 and each of which extends across the thickness of the two discs 18, and a spring 19 which has two branches engaged simultaneously in the cut-out 20 of the two discs 18, making these two discs tend to move angularly away from each other, and tending to maximize the eccentricity of the cam 16.

Thus, when at rest, the discs 18 of the cam 16 contribute to the braking of the pivot mechanism and take up the internal play of this mechanism. When a user rotates the operating shaft 11, the fingers 22 drive the two discs 18 by acting on one or other of these two discs against the action exerted by the spring 19, thus decreasing the overall eccentricity of the cam 16 with respect to the axis X, in such a way as to restore the internal play to the pivot mechanism to facilitate its actuation, as described for example in the document FR-A-2 770 810.

As shown in FIGS. 2, 3 and 5, the first seat frame 3a can be a piece of sheet metal having a cavity 27 aligned with the operating shaft 11 and an annular dished part 28 which projects towards the first plate 7 and comes into contact with the said first plate. This annular dished part 28 is welded to the first plate 7, for example by means of a laser weld formed along a sinuous annular weld line 29 (FIG. 5). The weld line 29 can be formed by transparency, in other words by illuminating the outer face of the bracket 2a (in other words the face opposite the first plate 7) with a laser beam.

The first plate 7 can have a relatively thick main body 7c in the vicinity of its toothing 14, and a thinner outer periphery 7d partially covered by the crimped ring 9 which extends partially between the first plate 7 and the first seat frame 3a, radially towards the outside of the annular dished part 28. The weld 29 is formed on the main body 7c, behind the teeth of the toothing 14, without causing damage to the said toothing. If necessary, the first plate 7 can be formed by die stamping a piece of sheet metal of constant thickness, thus forming the first toothing 14 and compressing the part of this piece of sheet metal located radially outside the first toothing to form the thinner periphery 7d: this manufacturing method is particularly simple, consists of a single step, and imparts a high mechanical strength to the first plate 7.

If necessary, the annular dished part 28 of the first seat frame 3a can have positioning means such as relief studs 30 (FIGS. 2 and 5) which project towards the first plate 7 and which, for example, enter holes 7b formed in the outer face of the said first plate 7 (FIG. 6), in other words in the face of the plate 7 located opposite the second plate 8.

As a result of these arrangements, the first seat frame 3a is fixed extremely strongly to the first plate 7 while the second plate 8 is also positioned correctly with respect to the back 2, which can prove to be particularly useful especially when the back 2 is operated by two identical or similar pivot mechanism 6 located one on each side of the seat and operated simultaneously by the same operating knob 6a, by means of a rigid connecting bar which drives the cams 16 of the two pivot mechanisms simultaneously.

Finally, the second plate 8 can also be fixed to the second seat frame 2a by a laser weld similar to the welding of the first seat frame 3a to the first plate 7, the second seat frame 2a being welded, for example, along a sinuous line 31 (FIG. 2), on the outer face of the second frame 8, behind the teeth of the second toothing 13. In the specific example which is illustrated, the second seat frame 2a is made from sheet metal and has a U-shaped part 32 which partially covers the outer face of the second plate 8 and extends parallel to the latter, this U-shaped part 32 being laser welded to the plate 8.

Figure 7:
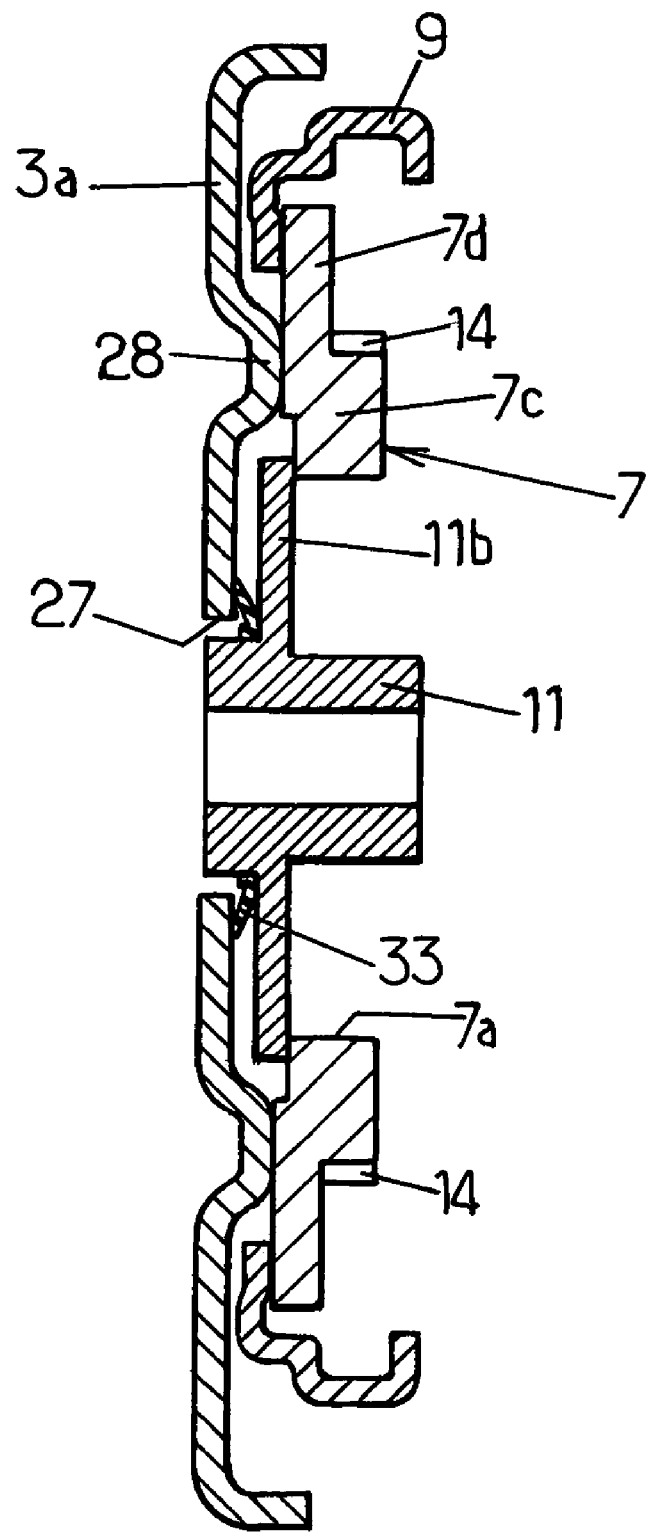
FIG. 7 is a view in axial section showing part of the pivot mechanism in a second embodiment of the invention.

In the second embodiment of the invention, shown in FIG. 7, the pivot mechanism is similar to that described previously and will therefore not be described again. This second embodiment is distinguished from the first by the following elements:

the operating shaft 11, which can for example be moulded from plastics material, is fixed to an annular collar 11b which covers the whole of an inner periphery of the first plate 7 and which is interposed between the first seat frame 3a and the said inner periphery, a flexible annular joint 33 made from an elastomer, for example a lip seal, is interposed between the operating shaft 11 and the first seat frame 3a, thus isolating the hypocycloid mechanism from the exterior (this prevents the ingress of liquid into the mechanism and/or leaks of lubricant).

It should be noted that, in all the embodiments of the invention, the plates 7 and 8 could be assembled by any means other than a crimped ring, for example by means of a welded bracket as described in patent application FR0406926 filed on 24 Jun. 2004.

Moreover, the hypocycloid gear train could be not only a single-train gear as described above, but also a satellite gear as described for example in the document EP-1-0 505 229.

Finally, the hypocycloid gear train can also be of the type described in the document FR-A-2 649 050, or of any other known type.

I claim:

1. A pivot mechanism comprising:
    first and second juxtaposed parallel rigid plates, interconnected by a hypocycloid gear train, the first plate having first and second faces, and the said first plate being formed in a single piece having an outer circular toothing belonging to the said hypocycloid gear train and positioned on the said first face,
    a first seat frame fixed to the first plate, wherein the first seat frame is welded to the second face of the first plate by at least one weld positioned in a location on the second face concentric to and having substantially the same radius as said outer circular toothing.

2. The pivot mechanism according to claim 1, in which the second face of the first plate is substantially flat.

3. The pivot mechanism according to claim 2, in which the first plate has a thick main body delimited in the radially outward direction by the first toothing, and a thinner outer periphery.

4. The pivot mechanism according to claim 3, in which the outer periphery of the first plate is covered by a crimped sheet metal ring which also partially covers the second plate and delimits, with the said first and second plates, a closed casing containing the hypocycloid gear train, the said ring additionally extending radially inwards between the first plate and the first seat frame.

5. The pivot mechanism according to claim 1, in which the first seat frame is a piece of sheet metal having an annular dished part projecting towards the first plate, the said annular dished part being welded to the second face of the said first plate.

6. The pivot mechanism according to claim 1, in which the weld incorporates at least one annular weld line.

7. The pivot mechanism according to claim 6, in which the weld line is sinuous.

8. The pivot mechanism according to claim 1, in which the weld is formed in an area entirely covered by the first seat frame.

9. The pivot mechanism according to claim 1, in which the hypocycloid gear train also comprises a second circular toothing engaging with the first toothing and mechanically linked to the second plate, the said first and second toothings having, respectively, first and second central axes which are parallel and offset with respect to each other, the pivot mechanism also incorporating an eccentric cam rotated by an operating shaft, this operating shaft being mounted rotatably about the second axis in a bearing which is fixed to the second plate, and the said cam being mounted rotatably about the first axis in a circular housing fixed to the first plate, so that a rotation of the cam causes a relative rotation between the first and second toothings.

10. The pivot mechanism according to claim 9, in which the second toothing is formed in one piece with the second plate.

11. Pivot mechanism according to claim 9, in which a flexible annular joint is interposed between the operating shaft and the first seat frame, thus isolating the hypocycloid mechanism from the exterior.

12. The pivot mechanism according to claim 9, in which the operating shaft is fixed to an annular collar which covers an inner periphery of the first plate and which is interposed between the first seat frame and the said inner periphery.

13. The pivot mechanism according to claim 1, comprising indexing means to provide angular indexing between the first plate and the second seat frame.

14. Method for manufacturing a pivot mechanism according to claim 1, in which method the first and second plates are assembled with the hypocycloid gear train, and the first seat frame is then welded to the first plate.

15. Method according to claim 14, in which the first seat frame is welded to the first plate by laser, through the first seat frame.

16. Method according to claim 14, in which the first plate is formed by die stamping a piece of sheet metal of constant thickness, thus forming the first toothing and compressing the part of this piece of sheet metal located radially outside the first toothing to decrease its thickness.

17. The vehicle seat incorporating a seat portion and a back, the back being mounted on the seat portion by means of at least one pivot mechanism according to claim 1.

* * * * *